US00RE34616E

United States Patent [19]

Komorowski et al.

[11] E Patent Number: Re. 34,616

[45] Reissued Date of Patent: May 24, 1994

[54] BELT TENSIONER WITH SPRING ACTUATED BAND BRAKE DAMPING

[75] Inventors: Jacek S. Komorowski, Weston; Klaus K. Bytzek, Schomberg, both of Canada

[73] Assignee: Litens Automotive Partnership, Woodbridge, Canada

[21] Appl. No.: 994,500

[22] Filed: Dec. 21, 1992

Related U.S. Patent Documents

Reissue of:

[64] Patent No.: 4,725,260
Issued: Feb. 16, 1988
Appl. No.: 29,695
Filed: Mar. 24, 1987

[51] Int. Cl.[5] ..... F16H 7/12

[52] U.S. Cl. ..... 474/135

[58] Field of Search ..... 474/101, 109, 111, 133, 474/135; 267/136, 137

[56] References Cited

U.S. PATENT DOCUMENTS 4,473,362 9/1984 Thomey et al. .
4,525,152 6/1985 Speer et al. .
4,557,707 12/1985 Thomey .
4,583,962 4/1986 Bytzek et al. .
4,596,538 6/1986 Henderson .
4,696,663 9/1987 Thomey et al. .

*Primary Examiner*—Thuy M. Bui
*Attorney, Agent, or Firm*—Cushman, Darby & Cushman

[57] ABSTRACT

A belt tensioning device having an improved damping mechanism for damping movements of the pivoted structure rotatably carrying the pulley with respect to the fixed structure. The damping mechanism includes a strap and a ring mounted on their respective fixed and pivoted structures and with respect to one another such that the strap engages the ring with a gripping action sufficient to provide (1) a relatively high resistance to frictional sliding movement between the strap and ring in one direction correspond to the direction of untensioning of the belt with the pulley and (2) a relatively low resistance to frictional sliding movement between the strap and ring in an opposite direction corresponding to the direction of belt tensioning. A spring is included in the mount for enabling the relatively high resistance and relatively low resistance to vary in response to the existence of predetermined vibrations such that the gripping action between strap and ring is relieved sufficient to enable movement therebetween in both directions to take place at substantially reduced resistance levels.

47 Claims, 2 Drawing Sheets

Fig. 3.
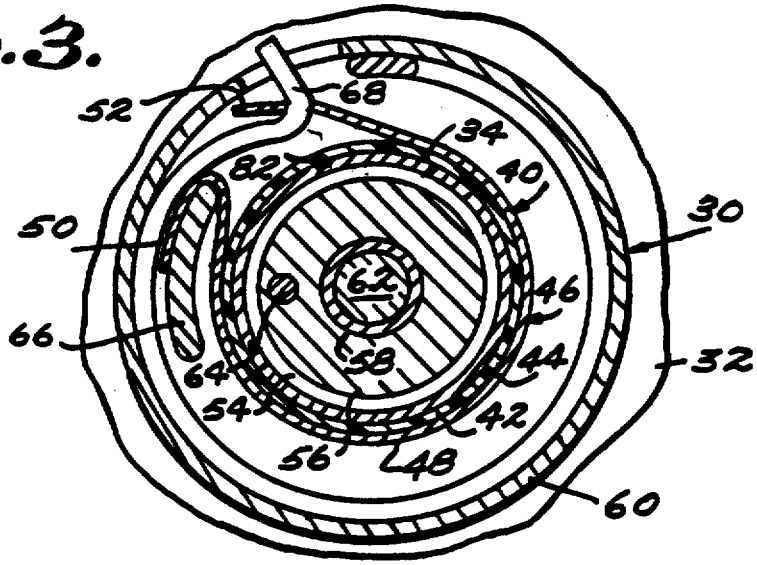
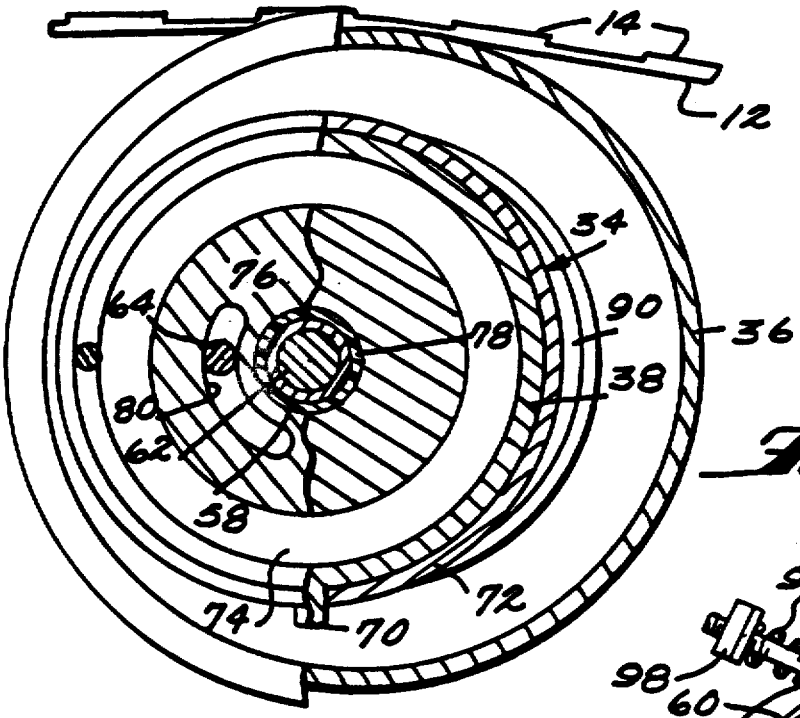
Fig. 5.
Fig. 4.
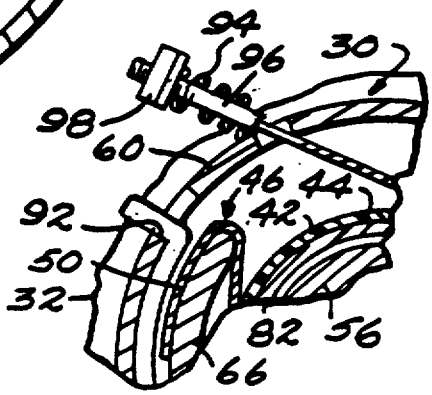

BELT TENSIONER WITH SPRING ACTUATED BAND BRAKE DAMPING

Matter enclosed in heavy brackets [ ] appears in the original patent but forms no part of this reissue specification; matter printed in italics indicates the additions made by reissue.

This invention relates to belt drive system and more particularly to improvements in belt tensioners utilized in belt drive systems.

In recent years, belt tensioners have been utilized in automobiles in connection with single serpentine belt systems which have been employed therein. The belt tensioners used with serpentine belt systems have included as an essential component thereof a damping means for preventing the vibrational movements to which the belt is subjected from reaching a resonant frequency with respect to the belt tensioner spring. An exemplary mechanism for providing the damping function is disclosed in U.S. Pat. No. 4,473,362. More specifically, damping is provided either by a combination of elastomeric material displacement and frictional sliding movement or solely by friction or sliding movement. It is conventional wisdom in providing a frictional sliding movement damping mechanisms to set the damping force in both directions not more than 35 or 40% of the instantaneous spring force acting between the pivoted structure and the fixed structure. This limitation was thought to be desirable to prevent pulley hang-up before it reaches its fully extended position. That is, it was felt that if too much frictional resistance was provided, the pulley would simply not move outwardly to tension the belt as the belt elongated so as to require such tension. On the other hand, it is well known that there are many serpentine belt systems where the engine or other instrumentalities in the system present what is known as high dynamic conditions. Such systems are known as high dynamic systems and it is desirable in such systems to provide a greater degree of damping than the conventional wisdom would dictate. Another special circumstance where a high dynamic type load is particularly imposed upon belt tensioners is in the case where the tensioner is used to maintain a timing belt in properly tensioned relation. Indeed, the particularly stringent requirements of a belt tensioner for use with a timing belt has resulted in the development of special damping arrangements particularly for tensioners of this type. An example of such a tensioner is disclosed in U.S. Pat. No. 4,583,962. The damping system provided in the timing belt includes the provision of a one-way clutch mechanism and an additional damping mechanism of the friction type, the one-way clutch permitting normal dampened movements in the belt tensioning direction of pivotal movement but only limited movement in the opposite direction. There still exists a need for a belt tensioner having a simple damping mechanism which will accommodate high dynamic systems including serpentine belt systems of the type described above and timing belt systems.

It is an object of the present invention to fulfill that need. The invention is predicated on the principle that it is possible to provide a damping mechanism in a belt tensioner which provides for frictional sliding movement damping with a high damping torque resistance in the belt untensioning direction substantially greater than conventional wisdom would dictate, as for example 70% of the instantaneous spring force or greater. In accordance with the principles of the present invention such damping is provided by the frictional resistance to movement established by the gripping action between two relatively slidable surfaces preferably provided by an elongated structure engaged with a curved surface. Such components can be mounted with respect to the pivoted and belt tensioner of the fixed structure and with respect to one another so as to provide a gripping action which presents a high resistance to frictional movement in one direction corresponding to the belt untensioning direction and relatively low resistance to frictional movement in the opposite direction corresponding to the belt tightening or tensioning direction. Such an arrangement also provides for rapid release of the resistance when the mounting of the elongated structure is moved in a direction to disengage. Applicants have found that where this characteristic exists and the mounting includes a spring, not only the high but the relatively lower resistance in the opposite direction can both be relieved in response to high dynamic vibrational conditions to which the system is subjected.

Preferably, the torsional coil spring which provides the spring force for resiliently biasing the pivoted structure is also used as the spring in the mounting. Preferably, the elongated structure is in the form of a steel strap or band having one end connected simply to one end of the coil spring and its opposite end fixed so as to extend around and engage an exterior cylindrical surface of a ring. By utilizing the spring in this fashion, the proportional damping characteristics referred in U.S. Pat. No. 4,473,362 are obtained. Alternatively, where different vibrational characteristics are required to be accommodated a separate special spring attuned to such vibrational characteristics may be utilized.

Another object of the present invention is the provision of a belt of the type described having an improved damping mechanism which is simply in construction, effective in operation, and economical to manufacture.

These and other objects of the present invention will become more apparent during the course of the following detailed description and appended claims.

The invention may best be understood with reference to the accompanying drawings wherein illustrative embodiments are shown.

IN THE DRAWINGS

FIG. 3 is a sectional view taken along the line 3—3 of FIG. 2;

FIG. 4 is a sectional view taken along the line 4—4 of FIG. 2;

Figure 6:
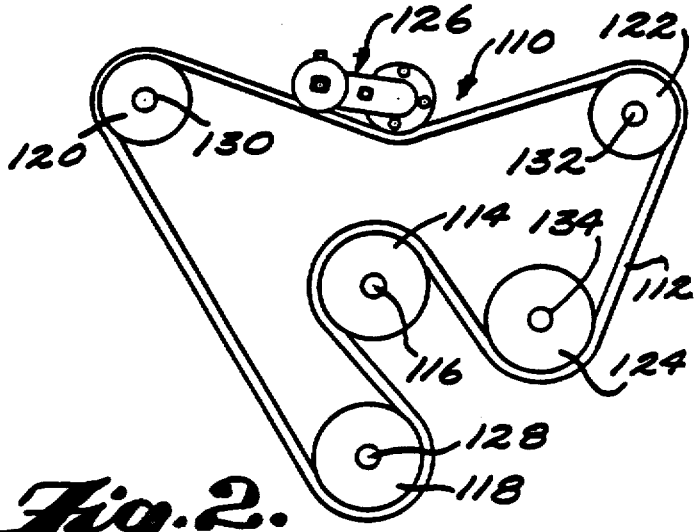
Figure 2:
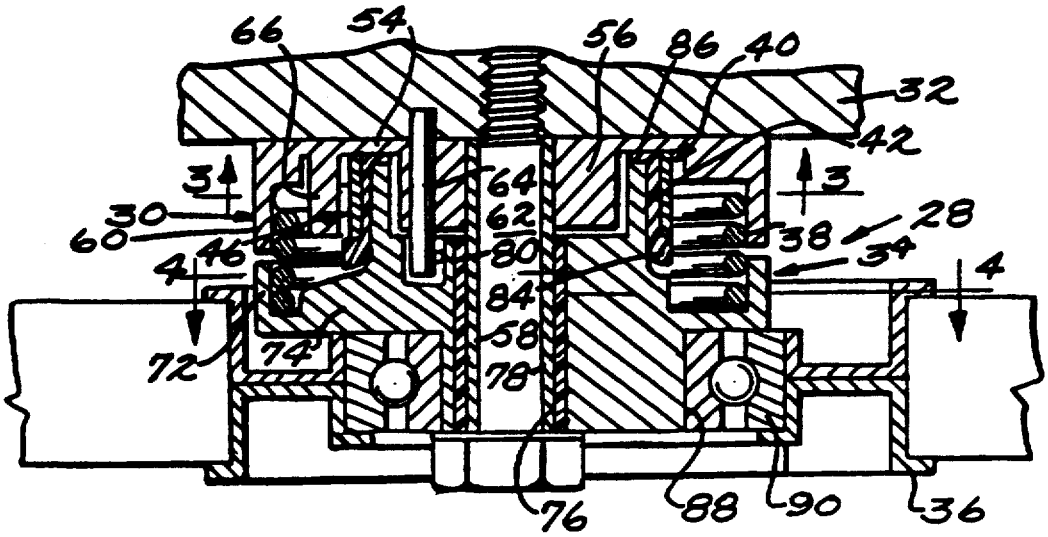
FIG. 2 is an enlarged cross-sectional view taken along the line 2—2 of FIG. 1.

FIG. 5 view similar to FIG. 2 showing an alternative embodiment of the present invention; and FIG. 6 is a schematic view of a serpentine belt system utilizing a belt tensioner constructed in accordance with the principles of the present invention.

Figure 1:
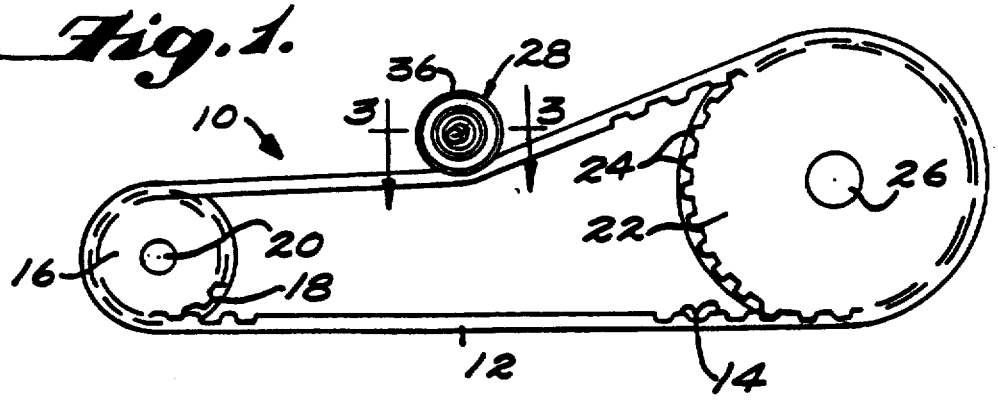
FIG. 1 is a diagrammatic view of a timing belt system utilizing a belt tensioner constructed in accordance with the principles of the present invention.

Referring now more particularly to the drawings there is shown in FIG. 1 thereof an automotive engine timing belt and pulley system, generally indicated at 10, which includes a conventional flexible timing belt 12, having the usual teeth 14 on the interior periphery thereof. The timing belt 12 is trained about a drive timing pulley 16 with exterior teeth 18 connected to the output shaft 20 of the automotive engine and a driven timing pulley 22 with exterior teeth 24 connected to the cam shaft 26 of the automotive engine. Mounted in operative relation to the timing belt is a belt tensioning device, generally indicated at 28, which embodies the principles of the present invention. The belt tensioning device 28 provides for the application of a substantially constant tension to the timing belt 12 of the system 10 over an extended period of time during which the belt tends to become longer.

Referring now more particularly to FIGS. 2–4 of the drawings, the belt tensioning device 28 of the present invention includes a fixed structure 30 which is adapted to be secured to a bracket plate 32 or the like in a stationary position with respect to the engine block. The belt tensioning device 28 also includes a pivoted structure 34 which is mounted with respect to the fixed structure 30 for pivotal movements in opposite directions about a fixed first axis between first and second limiting positions. The pivoted structure carries a timing belt engaging pulley 36 for rotational movement about a second axis parallel with the first axis. A torsion coil spring 38 is provided for resiliently biasing the pivoted structure to move in a direction away from the first limiting position thereof toward the second limiting position with a spring force which decreases as the pivoted structure is moved in a direction away from the first position toward the second position. The movement of the belt away from its first position toward its second position tensions the belt.

In accordance with the principles of the present invention, movements of the pivoted structure 34 with respect to the fixed structure 30 both in the belt tensioning direction and in the opposite direction are controlled by a damping mechanism, generally indicated at 40. In the preferred form of the invention as shown in FIGS. 2–4 the damping mechanism 40 includes a ring 42 of a suitable friction material, as, for example, a resinous plastic such as nylon or the like. Preferred plastics include Zytel and Iglide. The ring provides a curved surface 44 which, as shown, constitutes the exterior cylindrical peripheral surface of the ring which is adapted to be engaged by an elongated structure, generally indicated at 46, forming another component of the damping mechanism 40. The elongated structure 46 is preferably in the form of a strap or band made of steel such as spring steel or stainless steel. As shown, the strap is preferably of relatively thin dimension as, for example, approximately 0.040 inches so as to be easily flexed to engage the surface 44 of the ring 42. However, it may be thicker or thinner if desired. The elongated structure in a free state has a radius bigger than the curved surface 44, so it is forced into contact with surface 44 by the force of the spring 38.

As best shown in FIG. 3, the strap 46 includes a central extent 48 which is engageable with the surface 44 of the ring 42 throughout a peripheral extent of approximately 270°. The extent of engagement may be smaller or larger but is preferably greater than 180° and less than 300°. The strap 46 includes ends 50 and 52 which extend beyond the central extent 48 by which the strap 46 is operatively mounted. The manner in which the ring 42 and the ends 50 and 52 of the strap 46 are mounted with respect to the fixed structure 30 and to the pivoted structure 34 and with respect to one another is such that the central extent 48 of the strap 46 engages the curved surface 44 of the ring 42 with a gripping action sufficient to provide (1) a relatively high resistance to frictional sliding movement between the central extent 48 of the strap and the curved surface 44 of the ring 42 in one direction corresponding to the pivotal movement of the pivoted structure 34 with respect to the fixed structure 30 in a direction toward the first position and (2) a relatively low resistance to frictional sliding movement between the central extent 48 of the strap 46 and the curved surface 44 of the ring 42 in an opposite direction corresponding to the pivotal movement of the pivoted structure 34 with respect to the fixed structure 30 in a direction away from the first position.

In accordance with the principles of the present invention, the relatively high resistance to frictional sliding movement is greater than 70% of the [instanteous] *instantaneous*spring force provided by the spring 38. By instantaneous spring force is meant the force provided by the spring at the particular position of the pivoted with respect to the fixed structure at which the amount of [relative] *relatively* high resistance to frictional sliding movement is measured.

In the case of the belt tensioner 28 which is utilized in the timing belt system 10, an exemplary relatively high resistance to frictional sliding movement is 200% of the [instanteous] *instantaneous* spring force. The relatively low resistance to frictional sliding movement is less than the relatively *high* resistance and preferably is in the range of 35% or less although it may be more than 35% as will be evident from the description hereinafter set forth.

The resistance to frictional sliding movement in both directions may also be made to vary proportional to the variance in the spring force which, as previously indicated, diminishes as the pivoted structure 34 away from its first position and toward its second position. The proportional arrangement is illustrated in the embodiment shown in FIGS. 2–4. The arrangement is provided essentially by the manner in which the ring 42 and ends 50 and 52 of the strap 46 are mounted on the pivoted structure 34 and fixed structure 36 respectively and with respect to one another.

As best shown in FIG. 2, the fixed structure 30 is in the form of an annular member 54 including a central portion 56 within which a tubular hub 58 is fixedly mounted so as to extend axially outwardly thereof. The annular member 54 also includes an axially outwardly extending peripheral flange 60. A bolt 62 or the like extends through the hollow hub 58 into the bracket or support plate 32 so as to fixedly secure the fixed structure to the support plate 32. A locating pin 64 extending through the central portion 56 of the annular member 54 serves to accurately locate and fix the fixed structure 30 with respect to a central bolt 62.

Extending axially outwardly from the annular member 54 in a position between the central portion 56 and the peripheral flange 60 is a fixed integral lug structure 66 to which the end 50 of the strap 46 is connected as by bending the latter around the lug 66. The opposite end 52 of the strap 46 is apertured and connected to an end of the coil spring 38, as by bending the end thereof as indicated at 68, and extending the same through the aperture in the end 50 of the strap 46. As best shown in FIG. 4, the opposite end of the coil spring is bent, as indicated at 70, and extends through a central peripheral flange 72 provided on an annular member 74 forming the pivoted structure 34. The flange 72 extends axially toward the peripheral flange 60 of the fixed structure 30 and the two flanges serve to provide an exterior peripheral wall structure defining the exterior of a chamber within which the coil spring 38 is received.

The annular member 74 includes a central bore 76 extending therethrough which is engaged over the axial extension of the tubular hub 58. A sleeve bearing 78 is disposed between the interior periphery of the bore 76 and the exterior periphery of the tubular hub 58 to journal the annular member 74 on the fixed structure 30 for pivotal movements in both directions about the axis of the tubular hub 58. To limit the pivotal movement of the annular member 74 with respect to the fixed structure 30 between the aforesaid first and second portions, the pin 64 of the fixed 30 extends axially into an arcuate groove 80 formed in the adjacent portion of the pivoted structure. The annular member 74 also includes an intermediate annual flange 82 extending axially outwardly thereof in a direction toward the fixed structure 30 in surrounding relation to the central annular portion 56 thereof. The interior of the ring 42 is fixed on the exterior of the annular flange 82 and includes an inner outwardly curved mounting flange 84 and an outer inwardly extending mounting flange 86. In this way, the ring 42 is fixedly secured to the pivoted structure 34.

The outer portion of the annular member 74 is formed with an excentric exterior cylindrical surface 88 on which a ball bearing assembly 90 is fixed which serves to mount the pulley 36 rotatably on the annular member 74 for rotation about the aforesaid second axis.

In the preferred manner of mounting the strap 46 and ring 42 as in FIGS. 2–4, the ring 42 is operatively associated with the pivoted structure 34 and the strap is operatively associated with the fixed structure 30. As shown, the ring 42 is fixed on the pivoted structure 34 with its axis coincident with the pivotal axis of the pivoted structure. The end 50 of the strap 46 is fixed to the fixed structure 30 and the opposite end thereof is fixed to the opposite end of the coil spring 38. The arrangement is such that the strap and ring form essentially a band brake which has the characteristic of inherently providing a greater resistance to frictional sliding movement between the engaged surface of the strap and ring in a counterclockwise direction as viewed in FIG. 3, than in a clockwise direction, as viewed therein. As will be evident from FIGS. 1 and 3, the counterclockwise movement corresponds with movement of the pivoted structure in a direction towards the first position thereof while movement is movement toward the second position thereof which serves to tighten the belt.

It will be noted that the connection of the coil spring 38 with one end of the strap is such as to tend to move the two ends of the strap together in tightening relation with respect to the surface of the ring 42. Movement in the opposite direction tends to release the engagement and it will be noted that it does not require much movement to effect this release. This characteristic of the arrangement in conjunction with the utilization of the spring in the mounting establishes a condition in which vibrational movements to which the device is subjected during operation will result in the release of the gripping action. In this way, the resistance to frictional sliding movement in both directions can be set at higher levels than heretofore felt appropriate by virtue of the capability of the damping mechanism to release in response to high dynamic vibrations acting thereon. For example, a 200% resistance to movement in a direction toward the first position would serve to control the movement of the belt when the engine is shut off. By the same token, the vibrational movements which may occur as a result of shut off will tend to release the resistance to permit controlled movements where necessary to prevent damage.

The arrangement as described above wherein the end 52 of the strap 46 is connected with the end 68 of the spring 38 also serves to make the resistance provided by the engagement of the central extent 48 of the strap 46 with the exterior surface 44 of the ring 42 proportional to the spring force. This function is in accordance with the teachings contained in U.S. Pat. No. 4,473,362, the disclosure of which is hereby incorporated by reference into the present specification. Moreover, it will be noted that the force resisting sliding frictional contact between the strap and the ring are on the pivoted structure 34 in a direction which bisects the angle of wrap. Preferably, the strap is wrapped with respect to the ring so that the bisector extends in a direction which is parallel with the belt load acting on the pivoted structure 34 when the latter is in a position approximately one-quarter through its stroke in a direction away from its first position. The hub load acts on the pivoted structure 34 through the second axis of rotation of the pulley 36 in a direction through the bisector of the angle of wrap of the belt 12 with the pulley 36. With the arrangement shown, the belt tensioning force loads the sleeve bearing 76 unequally. That is, the belt tensioning force is transmitted from the pivoted structure to the bearing in a position axially offset from its center. By directing the damping force in the same direction at a position axially offset from the center of the hub in an opposite direction the total load on the bearing tends to be equalized and in this way the life of the bearing is extended.

Referring now more particularly to FIG. 5, there is shown therein a modification of the belt tensioner 28 which is with the principles of the present invention. In the modified arrangement shown, the end 68 of the coil spring 38 is directly connected with the fixed structure 30 in a fixed relation, as indicated at 92. The end 32 of the strap 46 is mounted on the fixed structure 30 in a manner independent of the coil spring 38 by a second spring 94. As shown, the second spring 94 is in the form of a compression coil spring surrounding the end of a fitting 96 fixed to the end 52 of the strap and having a nut 98 threaded thereon so as to engage one end of the spring while the other is engaged with the peripheral flange 60. With this arrangement, the resistance to frictional sliding movement between the strap and the ring is constant irrespective of the position of the pivoted structure 34 with respect to the fixed structure 30 and irrespective of the instantaneous spring force of spring 38. This arrangement may be desirable in particular circumstances because the provision of a separate spring 94 insures that particular vibrational conditions which might be encountered can be accommodated by choosing a spring which will resonate in response to such vibrational movements.

As previously indicated, the belt tensioner of the present invention is useful not only in a timing belt system such as shown in FIG. 1 but is also useful in other systems. For example, in FIG. 6 there is shown a serpentine belt system, generally indicated at 110, which includes a relatively large endless poly-V belt 112, a drive pulley 114 connected to the output shaft 116 of the automobile engine, four driven pulleys 118, 120, 122 and 124 and a belt tightener, generally indicated at 126 which embodies the principles of the present invention. In the arrangement shown, driven pulley 118 may be operatively connected with a shaft 128 for a cooling fan, driven pulley 120 may be mounted on a shaft 130 which forms a part of an alternator or the like, and driven pulley 122 is mounted on the shaft 132 which forms a part of an air conditioning compressor. It will be understood that the belt 112 is trained about the various pulleys in the manner indicated in the drawings, and the belt tensioner 126 is mounted in operative relation with the belt 112 so as to be capable of moving into a position enabling the belt 112 to be mounted on the other instrumentalities and then released to provided a desired tension on the belt in normal operative position. The belt tensioner 126 is mounted so as to provide for the application of substantially constant tension to the belt 112 of the system 110 over an extended period of time during which the belt tends to become longer. The construction of the belt tensioner 126 is essentially like the belt tensioner 28 except that the radial distance between the first pivotal axis of the pivoted structure 34 with respect to the fixed structure 30 and the second rotational axis of the pulley 36 is substantially greater in order to accommodate a greater amount of movement in the larger belt 112 of the system 110. Other modifications are within the scope of the present invention. For example, it would be possible to fix the ends of the strap with respect to the fixed structure and to resiliently mount the ring on the pivoted structure for radial movement so as to provide the aforesaid release in response to vibrational movements. Moreover it will be understood that rather than to have the mounting of the ring associated with the pivoted structure and the mounting of the strap associated with the fixed structure, the operative association could be reversed.

It thus will be seen that the objects of this invention have been fully and effectively accomplished. It will be realized, however, that the foregoing preferred specific embodiment has been shown and described for the purpose of illustrating the functional are structural principles of this invention and is subject to change without departure from such principles. Therefore, this invention includes all modifications encompassed within the spirit and scope of the following claims.

What is claimed is:

1. In a belt tensioning device comprising a fixed structure, a pivoted structure mounted with respect to said fixed structure for pivotal movement about a first axis between first and second limiting positions, a belt engaging pulley rotatably carried by said pivoted structure for rotational movement about a second axis parallel with said first axis, spring means acting between the fixed and pivoted structures for resiliently biasing said pivoted structure to move in a direction away from said first limiting position toward said second limiting position with a spring force which decreases as said pivoted structure is moved toward said second position, and curved surface means operatively associated with one of said structures, elongated means operatively associated with the other of said structures having a central extent engageable with said curved surface means and connecting means outwardly of the opposite ends of said central extent, means mounting said connecting means and said curved surface means on their respective structures and with respect to one another such that the central extent of said elongated means engages said curved surface means with a gripping action sufficient to provide (1) a relatively high resistance to frictional sliding movement between the central extent of said elongated means and said curved surface means in one direction corresponding to the pivotal movement of said pivoted structure with respect to said fixed structure in a direction toward said first position and (2) a relatively low resistance to frictional sliding movement between the central extent of said elongated means and said curved surface means in an opposite direction corresponding to the pivotal movement of said pivoted structure with respect to said fixed structure in a direction away from said first position, said mounting means including said spring means for enabling said relatively high resistance and said relatively low resistance to vary together (1) in proportion to changes in said spring force and (2) in response to the existence of predetermined vibrations such that said gripping action between the central extent of said elongated means and said curved surface means is relieved sufficient to enable movement between the central extent of said elongated means and said curved surface means in both directions to take place at substantially reduced resistance levels.

2. A belt tensioning device as defined in claim 1 wherein said elongated means comprises a flexible strap.

3. A belt tensioning device as defined in claim 2 wherein said spring means comprises a torsional coil spring having one end connected with said pivoted structure, said mounting means including means for connecting the opposite end of said coil spring with the connecting means on one end of said strap and means for connecting the connecting means on the other end of said strap in fixed relation on said fixed structure.

4. A belt tensioning device as defined in claim 3 wherein said curved surface comprises an exterior cylindrical surface fixed with respect to said pivoted structure in concentric relation with respect to said first axis.

5. A belt tensioning device as defined in claim 4 wherein the central extent of said strap is greater than 180° of said exterior cylindrical surface and less than 300° thereof.

6. A belt tensioning device as defined in claim 4 wherein said exterior cylindrical surface is provided by a ring of resinous plastic fixed to said pivoted structure.

7. A belt tensioning device as defined in claim 4 wherein said strap is formed of steel.

8. A belt tensioning device as defined in claim 4 wherein said pivoted structure is mounted on said fixed structure by a sleeve bearing which is unequally loaded by the force of the belt tension acting on said pivoted structure in a direction extending through the bisector of the angle of wrap of the belt on said belt engaging pulley, the gripping action force between the central extent of said strap and said exterior cylindrical surface acting on said pivoted structure in a direction extending through the bisector of the angle of engagement therebetween, loading said sleeve bearing in a direction tending to balance the unequal belt load thereon.

9. A belt tensioning device as defined in claim 1 wherein the pivoted structure is mounted on said fixed structure by a sleeve bearing which is unequally loaded by the force of the belt tension acting on said pivoted structure in a direction extending through the bisector of the angle of wrap of the belt with said belt engaging pulley, the gripping action force between said elongated means and said curved surface means loading said sleeve bearing in a direction tending to balance the unequal belt load thereon.

10. In a belt tensioning device comprising a fixed structure, a pivoted structure mounted with respect to said fixed structure for pivotal movement above a first axis between first and second limiting positions, a belt engaging pulley rotatably carried by said pivoted structures for rotational movement about a second axis with said first axis, spring means acting between the fixed and pivoted structures for resiliently biasing said pivoted structure to move in a direction away from said first limiting position toward said second limiting position with a spring force which decreases as said pivoted structure is moved toward said second position, and curved surface means operatively associated with one of said structures, elongated means operatively associated with the other of said structure engageable with said curved surface means, means mounting said elongated means and said curved surface means on their respective structures and with respect to one another such that said elongated means engages said curved surface means with a gripping action sufficient to provide (1) a relatively high resistance to frictional sliding movement between said elongated means and curved surface means in one direction corresponding to the pivotal movement of said pivoted with respect to said fixed structure in a direction toward said first position which is greater than 70% of the instantaneous spring force and (2) a relatively low resistance to frictional sliding movement between said elongated means and said curved surface means in an opposite direction corresponding to the pivotal movement of said pivoted structure with respect to said fixed structure in a direction away from said first position, said mounting means including said spring means for enabling said relatively high resistance and said relatively low resistance to vary together (1) in proportion to changes in said spring force and (2) in response to the existence of predetermined vibrations such that said gripping action between said elongated means and said curved surface means is relieved sufficient to enable movement between said elongated means and said curved means in both directions to take place at substantially reduced resistance levels.

11. A belt tensioning device as defined in claim 10 wherein said elongated means comprises a flexible strap having a central extent engageable with said curved surface means and opposite ends extending outwardly from said central extent.

12. A belt tensioning device as defined in claim 11 wherein said spring means comprises a torsional coil spring having one end connected with said pivoted structure, said mounting means including means for connecting the opposite end of said coil spring with one end of said strap and means for connecting the opposite end of said strap in fixed relation on said fixed structure.

13. A belt tensioning device as defined in claim 12 wherein said curved surface means comprises an exterior cylindrical surface fixed with respect to said pivoted structure in concentric relation with respect to said first axis.

14. A belt tensioning device as defined in claim 13 wherein the central extent of said strap is greater than 180° of said exterior cylindrical surface and less than 300° thereof.

15. A belt tensioning device as defined in claim 13 wherein said exterior cylindrical surface is provided by a ring of resinous plastic fixed to said pivoted structure.

16. A belt tensioning device as defined in claim 13 wherein said strap is formed of steel.

17. A belt tensioning device as defined in claim 13 wherein said pivoted structure is mounted on said fixed structure by a sleeve bearing which is unequally loaded by the force of the belt tension action on said pivoted structure in a direction extending through the bisector of the angle of wrap of the belt on said belt engaging pulley, the gripping action force between the central extent of said strap and said exterior cylindrical surface acting through the bisector of the angle of engagement therebetween loading said sleeve bearing in a direction tending to balance the load.

18. A belt tensioning device as defined in claim 10 wherein the pivoted structure is mounted on said fixed structure by a sleeve bearing which is unequally loaded by the force of the belt tension acting on said pivoted structure in a direction extending through the bisector of the angle of wrap of the belt with said belt engaging pulley, the gripping action force between said elongated means and said curved surface means loading said sleeve bearing in a direction tending to balance the unequal belt load thereon.

19. In a belt tensioning device comprising a fixed structure, a pivoted structure mounted with respect to said fixed structure for pivotal movement above a first axis between first and second limiting positions, a belt engaging pulley rotatably carried by said pivoted structure for rotational movement about a second axis parallel with said first axis, spring means acting between the fixed and pivoted structures for resiliently biasing said pivoted structure to move in a direction away from said first limiting position toward said second limiting position with a spring force which decreases as said pivoted structure is moved toward said second position, and curved surface means operatively associated with one of said structures, elongated means operatively associated with the other of said structures having a central extent engageable with said curved surface means and connecting means outwardly of the opposite ends of said central extent, means mounting said connecting means and said curved surface means on their respective structures and with respect to one another such that the central extent of said elongated means engages said curved surface means with a gripping action sufficient to provide (1) relatively high resistance to frictional sliding movement between the central extent of said elongated means and said curved surface means in one direction corresponding to the pivotal movement of said pivoted structure with respect to said fixed structure in a direction toward said first position and (2) a relatively low resistance to frictional sliding movement between the central extent of said elongated means and said curved surface means in an opposite direction corresponding to the pivotal movement of said pivoted structure with respect to said fixed structure in a direction away from said first position, said mounting means including second spring means for enabling said relatively high resistance and said relatively for enabling said resistance to vary together in response to the existence of predetermined vibrations such that said gripping action between the central extent of said elongated means and said curved surface means is relieved sufficient to enable movement between the central extent of said elongated means and said curved surface means in both directions to take place at substantially reduced resistance levels.

20. A belt tensioning device as defined in claim 19 wherein said elongated means comprises a flexible strap.

21. A belt tensioning device as defined in claim 20 wherein said spring means comprises a torsional coil spring having one end connected with said pivoted structure, said mounting means includes means for connecting said second spring means with said fixed structure and with the connecting means on one end of said strap and means for connecting the connecting means on the other end of said strap in fixed relation on said fixed structure.

22. The device as defined in claim 21 wherein said curved surface means comprises an exterior cylindrical surface fixed with respect to said pivoted structure in concentric relation with respect to said first axis.

23. A belt tensioning device as defined in claim 22 wherein the central extent of said strap is greater than 180° of said exterior cylindrical surface and less than 300° thereof.

24. A belt tensioning device as defined in claim 22 wherein said exterior cylindrical surface is provided by a ring of resinous plastic fixed to said pivoted structure.

25. A belt tensioning device as defined in claim 22 wherein said strap is formed of steel.

26. A belt tensioning device as defined in claim 22 wherein said pivoted structure is mounted on said fixed structure by a sleeve bearing which is unequally loaded by the force of the belt tension acting on said pivoted structure in a direction extending through the bisector of the angle of wrap of the belt on said belt engaging pulley, the gripping action force between the central extent of said strap and said exterior cylindrical surface acting on said pivoted structure in a direction extending through the bisector of the angle of engagement therebetween, loading said sleeve bearing in a direction tending to balance the unequal belt load thereon.

27. A belt tensioning device as defined in claim 19 wherein the pivoted structure is mounted on said fixed structure by a sleeve bearing which is unequally loaded by the force of the belt tension acting on said pivoted structure in a direction extending through the bisector of the angle of wrap of the belt with said belt engaging pulley, the gripping action force between said elongated means and said curved surface means loading said sleeve bearing in a direction tending to balance the unequal belt load thereon.

28. In a belt tensioning device comprising a fixed structure, a pivoted structure mounted with respect to said fixed structure for pivotal movement above a first axis between first and second limiting positions, a belt engaging pulley rotatably carried by said pivoted structure for rotational movement about a second axis parallel with said first axis, first spring means acting between the fixed and pivoted structures for resiliently biasing said pivoted structure to move in a direction away from said first limiting position toward said second limiting position with a spring force which decreases as said pivoted structure is moved toward said second position, and curved surface means operatively associated with one of said structures, elongated means operatively associated with the other of said structures engageable with said curved surface means, means mounting said elongated means and said curved surface means on their respective structures and with respect to one another such that said elongated means engages said curved surface means with a gripping action sufficient to provide (1) a relatively high to frictional sliding movement between said elongated means and said curved surface means in one direction corresponding to the pivotal movement of said pivoted structure with respect to said fixed structure in a direction toward said first position which is greater than 70% of the instantaneous spring force and (2) a relatively low resistance to frictional sliding movement between said elongated means and said curved surface means in an opposite direction corresponding to the pivotal movement of said pivoted structure with respect to said fixed structure in a direction away from said first position, said mounting means including second spring means for enabling said relatively high resistance and said relatively low resistance to vary together in response to the existence of predetermined vibrations such that said gripping action between said elongated means and said curved surface means is relieved sufficient to enable movement between said elongated means and said curved surface means in both directions to take place at substantially reduced resistance levels.

29. A belt tensioning device as defined in claim 28 wherein said elongated means comprises a flexible strap having a central extent engageable with said curved surface means and opposite ends extending outwardly from said central extent.

30. A belt tensioning device as defined in claim 29 wherein said mounting means includes means for connecting said second spring means with said fixed structure and with one end of said strap and means for connecting the opposite end of said strap in fixed relation on said fixed structure.

31. A belt tensioning device as defined in claim 30 wherein said curved surface means comprises an exterior cylindrical surface fixed with respect to said pivoted structure in concentric relation with respect to said first axis.

32. A belt tensioning device as defined in claim 31 wherein the central extent of said strap is greater than 180° of said exterior cylindrical surface and less than 300° thereof.

33. A belt tensioning device as defined in claim 31 wherein said exterior cylindrical surface is provided by a ring of resinous plastic fixed to said pivoted structure.

34. A belt tensioning device as defined in claim 31 wherein said strap is formed of steel.

35. A belt tensioning device as defined in claim 31 wherein said pivoted structure is mounted on said fixed structure by a sleeve bearing which is unequally loaded by the force of the belt tension acting on said pivoted structure in a direction extending through the bisector of the angle of wrap of the belt on said belt engaging pulley, the gripping action force between the central extent of said strap and said exterior cylindrical surface acting on said pivoted in a direction extending through the bisector of the angle of engagement therebetween, loading said sleeve bearing in a direction tending to balance the load.

36. A belt tensioning device as defined in claim 28 wherein the pivoted structure is mounted on said fixed structure by a sleeve bearing which is unequally loaded by the force of the belt tension acting on said pivoted structure in a direction extending through the bisector of the angle of wrap of the belt with said belt engaging pulley, the gripping action force between said elongated means and said curved surface means loading said sleeve bearing in a direction tending to balance the unequal belt load thereon.

37. A belt tensioner comprising, a fixed structure, a pivoted structure, a belt tensioning pulley mounted on said pivoted structure for rotational movement about a rotational axis, said pivoted structure being mounted on said fixed structure for pivotal movement about a fixed pivotal axis parallel with said rotational axis between a first position wherein said belt tensioning pulley can be transversely aligned with a loosely trained belt and a second position, spring means for resiliently biasing said pivoted structure in a direction toward said second position with a spring torque which varies as the position of the pivotal structure approaches said second position permitting manual movement of said belt tensioning pulley into said first position against such resilient bias so that upon manual release the resilient bias moves said belt tensioning pulley into an intermediate operating static equilibrium position in tensioning engagement with the belt wherein the spring torque is equal and opposite to a belt load torque which varies with the variation in the spring torque as the intermediate operation position approaches said second position due to belt elongation by maintaining the belt load force generally constant and varying the lever arm to said pivotal axis through which the belt load force acts, *the spring torque at any intermediate operating position being provided by the instantaneous spring force at the intermediate operating position and the lever arm to the pivotal axis through which the instantaneous spring force acts,* means for damping the pivotal movements of said pivoted structure as a result of dynamic belt load forces varying from the generally constant belt load force when the belt is moving, said damping means including sliding friction surface means for establishing a damping torque resistance to pivotal movement of said pivoted structure in a direction toward said first position by virtue of the pressure of interengagement of said sliding friction surface means and the position of interengagement of said sliding friction surface means from said pivotal axis of a magnitude sufficient to prevent movement in the constant belt load force *within 70% of the instantaneous spring force*, and means operable in response to the application of vibratory forces to said sliding friction surface means independent of the dynamic belt load forces for instantaneously releasing the damping torque resistance to pivotal movement in said direction established by said sliding friction surface means so that instantaneous movement in said direction can take place which would otherwise be prevented.

38. A belt tensioner as defined in claim 37 wherein said sliding friction surface means establishes a damping torque resistance to pivotal movement of said pivoted structure in a direction toward said second position which is less than the damping torque resistance to pivotal movement in a direction toward said first position and said damping torque resistance releasing means is operable to instantaneously release the damping torque resistance to pivotal movement in the direction toward said second position.

39. A belt tensioner as defined in claim 38 wherein said damping means includes a band brake assembly including a ring operatively associated with one of said structures and a band operatively associated with the other of said structures, said band and ring having interengaging surfaces constituting said sliding friction surface means.

40. A belt tensioner as defined in claim 39 wherein said releasing means comprises a spring resiliently connecting one end of said band to said fixed structure, said spring being tuned to said independent vibratory forces.

*41. A belt tensioner as defined in claim 37 wherein said sliding friction surface means is operable to establish a damping torque resistance of a magnitude sufficient to prevent movement in said direction in response to dynamic increases on the constant belt load force within 200% of said instantaneous spring force.*

*42. A belt tensioner comprising,*

*a fixed structure,*

*a pivoted structure,*

*a belt tensioning pulley mounted on said pivoted structure for rotational movement about a rotational axis,*

*said pivoted structure being mounted on said fixed structure for pivotal movement about a fixed pivotal axis parallel with said rotational axis between a first position wherein said belt tensioning pulley can be transversely aligned with a loosely trained belt and a second position,*

*spring means for resiliently biasing said pivoted structure in a direction toward said second position with a spring torque which decreases as the position of the pivotal structure approaches said second position permitting manual movement of said belt tensioning pulley into said first position against such resilient bias so that upon manual release the resilient bias moves said belt tensioning pulley into an intermediate operating static equilibrium position in tensioning engagement with the belt wherein the spring torque is equal and opposite to a belt load torque which varies with the variation in the spring torque as the intermediate operation position approaches said second position due to belt elongation by maintaining the belt load force generally constant and varying the lever arm to said pivotal axis through which the belt load force acts,*

*the spring torque at any intermediate operating position being provided by the instantaneous spring force at the intermediate operating position and the lever arm to*

*the pivotal axis through which the instantaneous spring force acts,*

*interengaging sliding friction damping surfaces operatively associated with said fixed structure and said pivoted structure for damping the pivotal movements of said pivoted structure as a result of dynamic belt load forces varying from the generally constant belt load force when the belt is moving,*

*said interengaging damping surfaces presenting sliding friction therebetween sufficient to establish a damping torque resistance to pivotal movement of said pivoted structure in a direction toward said first position by virtue of the pressure of interengagement of said damping surfaces and the position of interengagement of said damping surfaces from said pivotal axis of a magnitude sufficient to prevent movement in said direction in response to dynamic increases in the constant belt load force within 70% of said instantaneous spring force,*

*said interengaging damping surfaces and the operative association thereof respectively with said fixed structure and said pivoted structure being operable in response to the application of vibratory forces to said damping surfaces through said fixed structure independent of the dynamic belt load forces to instantaneously release the damping torque resistance to pivotal movement in said direction established by said damping surfaces so that instantaneous movement in said direction can take place which would otherwise be prevented.*

*43. A belt tensioner as defined in claim 42 wherein the sliding friction between said interengaging damping surfaces is operable to establish a damping torque resistance of a magnitude sufficient to prevent movement in said direction in response to dynamic increases in the constant belt load force within 200% of said instantaneous spring force.*

*44. A belt tensioner as defined in claim 43 wherein said interengaging damping surfaces establish a damping torque resistance to pivotal movement of said pivoted structure in a direction toward said second position which is less than the damping torque resistance to pivotal movement in a direction toward said first position.*

*45. A belt tensioner as defined in claim 44 wherein said interengaging damping surfaces include a first damping surface on a ring operatively associated with one of said structures and a second damping surface on a band operatively associated with the other of said structures.*

*46. A belt tensioner as defined in claim 45 wherein said second damping surface is operatively associated with said fixed structure and the operative association is operable to effect said release.*

*47. A belt tensioner as defined in claim 46 wherein the operative association of said second damping surface with said fixed structure includes a fixed connection between one end of said band and said fixed structure, an opposite end of said band being connected with one end of a torsion coil spring constituting a said spring means, an opposite end of said torsion coil spring being connected to said pivoted structure.*

* * * * *